United States Patent Office 3,517,013
Patented June 23, 1970

3,517,013
ANTHRAPYRIDONE AND ANTHRAQUINONE DYES CONTAINING 1 OR 2β-SULFATO-, β-THIOSULFATO- OR β - VINYLETHYLSULFO- NYLALKANOYL - N - METHYLENEAMINE GROUPS
Takashi Akamatsu, Ashiya-shi, Hirohito Kenmochi, Toyonaka-shi, Hideaki Suda, Osaka, and Seiji Hotta, Minooshi, Japan, assignors to Sumitomo Chemical Company, Ltd., Osaka, Japan, a corporation of Japan
No Drawing. Filed Mar. 22, 1965, Ser. No. 441,912
Claims priority, application Japan, Mar. 24, 1964, 39/16,278, 39/16,279; Mar. 27, 1964, 39/16,848, 39/16,849; Apr. 1, 1964, 39/18,201; Apr. 2, 1964, 39/18,442; Feb. 25, 1965, 40/10,819; Mar. 1, 1965, 40/11,974; Mar. 6, 1965, 40/13,008, 40/13,009
Int. Cl. C09b 62/72, 62/74, 62/76
U.S. Cl. 260—278   1 Claim

ABSTRACT OF THE DISCLOSURE

Anthraquinone reactive dyes containing one or two reactive groups having the formula,

wherein $R^1$ means hydrogen atom, an alkyl having 1 or 2 carbon atoms; $R^2$ means an alkylene having 1 or 2 carbon atoms; and Y means β-sulfatoethyl, vinyl, β-thiosulfatoethyl or —$CH_2CH_2Z$ wherein Z means

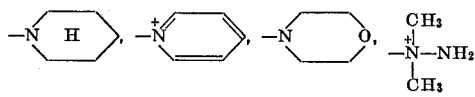

or

wherein $R^3$ means hydrogen atom or an alkyl having 1 to 3 carbon atoms; $R^4$ means hydrogen atom, an alkyl having 1 to 3 carbon atoms or amino.

The dye may be employed for dyeing, especially, wool, polyamide fiber, silk or cotton with excellent fastness to light and moisture.

The present invention relates to novel dyes, methods for producing the same, and methods for dyeing fiber articles with the same with fastnesses.

Reactive dyes containing the group of the formula

—$SO_2CH=CH_2$ (or —$SO_2CH_2CH_2OSO_3H$)

or

—$CH_2SO_2CH_2CH_2OSO_3H$ are hitherto known, and the methods for producing such dyes are disclosed in the literatures such as U.S. Pat. No. 2,657,205 (1953) and U.S. Pat. No. 2,670,265 (1954) of Farbwerke Hoechst Aktiengesellschaft and British Pat. No. 917,104 (1963) of General Aniline and Film Corporation.

However, these dyes are not yet satisfactory in their manufacture, because they require expensive raw materials such as nitrosulfinic acid derivatives, phenylvinyl sulfide or phenyl β-hydroxyethyl sulfide derivatives, or benzyl β-hydroxyethyl sulfide derivatives, and because they require extremely complex operation procedure, as the reactive group cannot be introduced directly into the common dyes, and further because their yields are unsatisfactory. Accordingly these known dyes are disadvantageous from the economical point of view.

The present invention provides a solution to these problems.

One object of the present invention is to provide new reactive dyes and another object is to provide methods for producing such dyes commercially advantageously with cheaper and easier operation by introducing reactive groups, which will be shown later, directly into the known various organic dyes in one process and in high yield. Another object is to provide methods for dyeing fiber articles with such dyes.

Still other objects will be apparent from the following descriptions.

In order to accomplish these objects the present invention provides new reactive dyes containing at least one of the reactive groups having the following general formula:

wherein $R^1$ represents a member selected from the group consisting of hydrogen atom and lower alkyl radicals having 1 to 2 carbon atoms, $R^2$ represents a lower alkylene group having 1 to 2 carbon atoms and Y represents a member selected from the group consisting of β-sulfatoethyl, vinyl and β-thiosulfatoethyl radicals, and

—$CH_2CH_2Z$ radicals wherein Z represents a member selected from the group consisting of secondary and tertiary amine residues and quaternary ammonium salts residues; and the methods for producing new reactive dyes containing at least one of the reactive group having the following general formula:

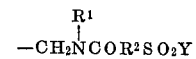

wherein $R^1$ represents a member selected from the group consisting of hydrogen atom and lower alkyl radicals having 1 to 2 carbon atoms, $R^2$ represents a lower alkylene group having 1 to 2 carbon atoms and Y represents a member selected from the group consisting of β-sulfatoethyl, vinyl and β-thiosulfatoethyl radicals, and

—$CH_2CH_2Z$ radicals wherein Z represents a member selected from the group consisting of secondary and tertiary amine residues and quaternary ammonium salts residues, which comprises reacting a reactive compound having the following general formula:

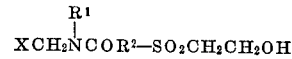

wherein X represents a member selected from the group consisting of hydroxy radical and chlorine and bromine atoms, $R^1$ represents a member selected from the group consisting of hydrogen atom and lower alkyl radicals having 1 to 2 carbon atoms and $R^2$ represents a lower alkylene group having 1 to 2 carbon atoms, with a known dye in sulfuric acid medium, said reactive compound being in an amount of from 1 to 5 moles per mole of said dye, and treating the organic dye containing the reactive group having the sulfatoethyl group as Y in the above-identified formula, with a weak alkaline aqueous solution to convert the β-sulfatoethyl group into vinyl group, and treating the organic dye containing the reactive group having a group, as Y in the above-identified formula, selected from the group consisting of β-sulfatoethyl group and vinyl group, with a member selected from the group consisting of primary, secondary and tertiary amines in an aqueous medium to convert the group selected from the group consisting of β-sulfatoethyl group and vinyl group into —$CH_2CH_2Z$ group wherein

3

Z represents a member selected from the group consisting of secondary and tertiary amine residues and quaternary ammonium salt residues, and treating the organic dye containing the reactive group having a group, as Y in the above-identified formula, selected from the group consisting of β-sulfatoethyl group and vinyl group, with a thiosulfate salt in an aqueous solution to convert the group selected from the group consisting of β-sulfatoethyl group and vinyl group into a β-thiosulfatoethyl group; and further the methods for dyeing fiber articles selected from the group consisting of nitrogen containing and polyhydroxy fibers, characterized by using a new reactive dye containing at least one of the reactive group having the following general formula:

$$-CH_2\overset{R^1}{N}COR^2SO_2Y$$

wherein $R^1$ represents a member selected from the group consisting of hydrogen atom and lower alkyl radicals having 1 to 2 carbon atoms, $R^2$ represents a lower alkylene group having 1 to 2 carbon atoms, and Y represents a member selected from the group consisting of β-sulfatoethyl, vinyl and β-thiosulfatoethyl radicals, and $$-CH_2CH_2Z$$

radicals wherein Z represents a member selected from the group consisting of secondary and tertiary amine residues and quaternary ammonium salts residues. Further the present invention provides the new reactive compounds having the following general formula:

$$XCH_2\overset{R^1}{N}COR^2-SO_2CH_2CH_2OH$$

wherein X represents a member selected from the group consisting of hydroxy radical and chlorine and bromine atoms, $R^1$ represents a member selected from the group consisting of hydrogen atom and lower alkyl radicals having 1 to 2 carbon atoms and $R^2$ represents a lower alkylene group having 1 to 2 carbon atoms, and the method for producing the new reactive compounds having the following general formula:

$$XCH_2\overset{R^1}{N}COR^2-SO_2CH_2CH_2OH$$

wherein X represents a member selected from the group consising of hydroxy radical and chlorine and bromine atoms, $R^1$ represents a member selected from the group consisting of hydrogen atom and lower alkyl radicals having 1 to 2 carbon atoms and $R^2$ represents a lower alkylene group having 1 to 2 carbon atoms, which comprises oxidizing with hydrogen peroxide the compound having the following general formula:

$$NCR^2S-CH_2CH_2OH$$

wherein $R^2$ represents a lower alkylene group having 1 to 2 carbon atoms, hydrolyzing the product with alkaline hydrogen peroxide to prepare the compound having the following general formula:

$$NH_2COR^2SO_2CH_2CH_2OH$$

wherein $R^2$ represents the same meanings as identified above, and conducting the treatment selected from the group consisting of N-methylolation and N-halomethylation, and N-alkylation when $R^1$ is an alkyl.

According to the present invention, the new reactive dyes are produced advantageously in one process and in high yield, by reacting the new reactive compounds of the present invention, which is easily obtained in low cost, with the various organic dyes. This is one of the characteristic features of the present invention.

And the new reactive dyes of the present invention is exceedingly superior to the known reactive dyes concerning the dyeability and fastnesses. This is another characteristic feature of the present invention.

As the organic dyes employed in the present invention, various known dyes containing at least one of the aryl residues which possesses at least a hydrogen atom which can be substituted, may be employed.

Examples of the dyes include anthraquinone dyes, mono and disazo-dyes, metal containing azo-dyes, phthalocyanine dyes, nitro dyes, naphthoquinone dyes, dioxazine dyes, aminonaphthalimide dyes, polycyclic type dyes such as perinone and dibenzanthrone, carbonium dyes such as rhodamine and azine and the like.

Among the dyes as above-described, anthraquinone dyes, azo-dyes and phthalocyanine dyes have most important commercial value.

As the anthraquinone series dyes, for example, 1-amino-4-arylaminoanthraquinone,
1-amino-2-methyl-4-arylaminoanthraquinone,
1-amino-2-halo-4-arylaminoanthraquinone,
1-amino-4-arylaminoanthraquinone-2-sulfonic acid,
1-amino-2-aryloxy-4-arylaminoanthraquinone,
1-amino-2-alkoxy-4-arylaminoanthraquinone,
1-alkylamino-4-arylaminoanthraquinone,
1-hydroxy-4-arylaminoanthraquinone,
1,4-diamino-2-aryloxyanthraquinone,
1,4-diamino-2,3-diaryloxyanthraquinone,
1,4-diarylaminoanthraquinone,
1,5-diarylaminoanthraquinone,
4-arylamino-1,9-anthrapyridone,
4-arylamino-1,9-anthrapyridone-2-sulfonic acid,
2-aryloxy-4-arylamino-1,9-anthrapyridone,
1,5-diamino-4,8-dihydroxy-2-(4'-alkoxyphenyl) anthraquinone,
1,5-dihydroxy-4-amino-8-arylaminoanthraquinone,
1,5-dihydroxy-4-nitro-8-arylaminoanthraquinone and
1,8-dihydroxy-4-nitro-8-arylaminoanthraquinone are given and the anthraquinone nucleus may be further substituted by sulfonic acid group and halogen atom.

As the azo-dyes, monoazo, disazo- and metal containing azodyes, having at least an aryl residue, in the diazo or coupling components, possessing at least a hydrogen atom which can be substituted, are employed. In the case of the said dyes having 2 or more of said aryl residues, said aryl residues may be contained in the both components of diazo and coupling components at the same time.

As the monoazo-dyes, for example, the following dyes are given:

2-arylazo-1-naphthol-4-sulfonic acid,
2-arylazo-1-naphthol-5-sulfonic acid,
2-arylazo-1-naphthol-3,6-disulfonic acid,
1-arylazo-2-naphthol,
1-arylazo-2-naphthol-6-sulfonic acid,
1-arylazo-2-naphthol-8-sulfonic acid,
1-arylazo-2-naphthol-3,6-disulfonic acid,
1-arylazo-2-naphthol-6,8-disulfonic acid,
2-arylazo-1,8-dihydroxynaphthalene-3,6-disulfonic acid,
7-amino-8-arylazo-1-naphthol-3-sulfonic acid,
7-acylamino-8-arylazo-1-naphthol-3-sulfonic acid,
7-arylamino-8-arylazo-1-naphthol-3-sulfonic acid,
7-arylamino-2-arylazo-1-naphthol-3-sulfonic acid,
6-acylamino-5-arylazo-1-naphthol-3-sulfonic acid,
8-arylamino-2-arylazo-1-naphthol-5-sulfonic acid,
8-amino-2-arylazo-1-naphthol-3,6-disulfonic acid,
8-acylamino-2-arylazo-1-naphthol-3,6-disulfonic acid,
8-aroylamino-2-arylazo-1-naphthol-3,6-disulfonic acid,
8-acylamino-2-arylazo-1-naphthol-3,5-disulfonic acid,
1-aryl-4-arylazo-3-methyl-5-pyrazolone and the like.

As the dis-azo dyes, for example, the following dyes are given:

2,4-bisarylazoresorcinol,
8-amino-2,7-bis-arylazo-1-naphthol-3,6-disulfonic acid,
1-(4'-arylazophenylazo)2-naphthol-6,8-disulfonic acid,
1-arylamino-4-(4'-arylazonaphthylazo)-naphthalene-8-sulfonic acid, 4-arylazo-4'-(2"-hydroxy-6",8"-disulfonaphthylazo)-2,2'-dimethyldiphenyl and the like.

As the phthalocyanine series dyes, for example, copper, cobalt or nickel phthalocyanine-3,3'-bis-N-arylsulfonamide-3",3'''-disulfonic acid, phthalocyanine-3-N-arylsulfonamide-3'-sulfonic acid, phthalocyanine-4,4'-bis-N-arylsulfonamide-4",4'''-disulfonic acid, 4,4'-bisaryloxyphthalocyanine, 4,4'-bisarylthiophthalocyanine, 3,3'-bis-arylaminomethylphthalocyanine, 3,3'-bisarylaminomethylphthalocyanine-3"-sulfonic acid and the like are given.

As apparent from the above descriptions, the aryl residue having hydrogen atom which can be substituted, are bonded with the dye frame through a nitrogen, oxygen, sulfur, carbon atom or their combinations, or constitute the dye frame by itself as in the case of arylazo group. The said aryl residues are benzene, diphenyl and diphenylamine series, and preferably include those having alkyl, hydroxy, alkoxy and aryloxy radicals together with at least a hydrogen atom which can be replaced, and they may have additional halogen, arylamino, acylamino and the like.

Examples of the aryl residue include 2-methylphenyl,
4-methylphenyl,
4-methoxyphenyl,
4-ethoxyphenyl,
4-phenoxyphenyl,
2,4-dimethylphenyl,
2,5-dimethylphenyl,
2,6-dimethylphenyl,
2-methyl-4-methoxyphenyl,
2-methyl-4-ethoxyphenyl,
2-methyl-4-phenoxyphenyl,
4-methyl-2-methoxyphenyl,
4-methyl-2-ethoxyphenyl,
4-methyl-2-phenoxyphenyl,
2,4,6-trimethylphenyl,
2,6-dimethyl-4-butylphenyl,
2,4-dimethyl-6-bromophenyl,
2,6-dimethyl-4-hydroxyphenyl,
2,6-dimethyl-4-methoxyphenyl,
2,6-dimethyl-4-ethoxyphenyl,
2,6-dimethyl-4-phenoxyphenyl,
2,2'-dimethyldiphenylene, and the like.

The introduction of the reactive compound into the selected organic dye is effected at the said aryl residue. Accordingly, it is preferred that the aryl residue be not previously substituted with a sulfonic group or a nitro group which interfere with introducing the reactive group. After the reaction, if desired, a sulfonic acid group may be introduced according to conventional procedures.

The reactive compounds of the present invention are the novel compounds having the following general formula:

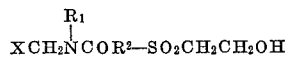

wherein X represents a member selected from the group consisting of hydroxy radical and chlorine and bromine atoms, $R^1$ represents a member selected from the group consisting of hydrogen atom and lower alkyl radicals having 1 to 2 carbon atoms and $R^2$ represents a lower alkylene group having 1 to 2 carbon atoms, and produced commercially by an advantageous method.

Typical examples of the reactive compounds are

HOCH$_2$NHCOCH$_2$CH$_2$SO$_2$CH$_2$CH$_2$OH,
HOCH$_2$NHCOCH$_2$SO$_2$CH$_2$CH$_2$OH,
ClCH$_2$NHCOCH$_2$CH$_2$SO$_2$CH$_2$CH$_2$OH,
ClCH$_2$NHCOCH$_2$SO$_2$CH$_2$CH$_2$OH,
HOCH$_2$N(CH$_3$)COCH$_2$CH$_2$SO$_2$CH$_2$CH$_2$OH,
HOCH$_2$N(CH$_3$)COCH$_2$SO$_2$CH$_2$CH$_2$OH,
ClCH$_2$N(CH$_3$)COCH$_2$CH$_2$SO$_2$CH$_2$CH$_2$OH, and
ClCH$_2$N(CH$_3$)COCH$_2$SO$_2$CH$_2$CH$_2$OH.

For example, $\beta(\beta'$ - hydroxyethylsulfonyl)propionyl-N-methylolamide having the formula

HOCH$_2$NHCOCH$_2$CH$_2$SO$_2$CH$_2$CH$_2$OH is prepared in good yield by oxidizing $\beta(\beta'$-hydroxyethylmercapto)propionitrile with hydrogen peroxide, and hydrolyzing the oxidation product with alkaline hydrogen peroxide to yield $\beta(\beta'$-hydroxyethylsulfonyl)propionylamide, and then treating the $\beta(\beta'$-hydroxyethylsulfonyl)propionylamide with formaline in a weak aqueous alkaline solution according to the conventional method; and the $\beta(\beta'$-hydroxyethylsulfonyl)propionyl - N - halomethylamide having the formula

XCH$_2$NHCOCH$_2$CH$_2$SO$_2$CH$_2$CH$_2$OH wherein X represents a member selected from the group consisting of chlorine and bromine atoms is prepared easily and advantageously by reacting $\beta(\beta'$-hydroxyethylsulfonyl)propionylamide with symmetrical dichloro- or dibromomethyl ether in sulfuric acid, and the resulting product may be employed to react with the dye while in the solution of sulfuric acid.

In another way the reactive compound of the present invention may be prepared by oxidizing with hydrogen peroxide the compound having the following general formula:

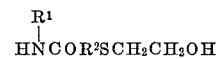

wherein $R^1$ represents a member selected from the group consisting of hydrogen atom and lower alkyl radicals having 1 to 2 carbon atoms, and conducting the treatment selected from the group consisting of N-methylolation and N-halo-methylation.

The reaction between the reactive compound and the mother's body of dyes as described above, is conducted in sulfuric acid preferably in a 80% to 100% sulfuric acid. One to five moles of the reactive compound per mole of the dye is employed. The reaction temperature range is from 0° to 60° C. preferably from 10° to 20° C. and the reaction period of time is in the range of from several hours to scores of hours.

The end point of the reaction can be confirmed by the paper chromatography using, for example, as the developing agent a mixture of 3 parts by weight of n-butanol, 1 part by weight of ethanol and 1 part by weight of water.

The disappearance of the dye in the paper chromatography shows the completion of the reaction.

In some instances the intermediate may be used instead of the finished dye. For example, in the case of azo dyes, it is also possible that the organic compound, which can be used for the production of azo dyes, is reacted with the reactive compound and the resulting product thereafter converted to an azo dye through the suitable reaction. The said organic compound which can be used for the production of azo dyes, may be either diazo component or coupling component and in both cases it is necessary for the organic compound to contain in the molecule the aryl residue which possesses the hydrogen atom which can be substituted.

The reactive compound likewise may be substituted by the corresponding intermediate compound, which can be used for the production of the reactive compound in sulfuric acid medium under the suited condition. For example $\beta(\beta'$-hydroxyethylsulfonyl)propionitrile can be reacted directly with dye in the presence of diahalomethyl ether, instead of reacting $\beta(\beta'$ - hydroxyethylsulfonyl)propionyl-N-halomethylamide with the dye.

Thus prepared organic dye containing the reactive group of the formula

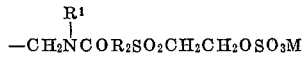

wherein $R^1$ and $R^2$ have the same meanings as identified above and M is a hydrogen atom or an alkali metal, can be easily converted to the dye containing the reactive group of the formula, $$-CH_2\underset{|}{N}-CO-R^2-SO_2-CH=CH_2$$
$$\phantom{-CH_2N}R^1$$

wherein $R^1$ and $R^2$ have the same meanings as identified above by the weak alkali treatment in an aqueous medium at a room temperature. As the alkaline material, sodium hydroxide, sodium carbonate, trisodium phosphate and sodium bicarbonate may be employed. The conversion of from sulfatoethyl group to vinyl group by the alkaline treatment occurs extremely easily, for example, the conversion can be conducted enough by adding the alkaline material into an aqueous solution of the dye to adjust the pH of the solution in a range of 8 to 9 and stirring the solution for a short period of time, heating being not required. The completion of the conversion of frm sulfatoehyl group to vinyl group can be confirmed, by the paper chromatography using, for example, as a developing agent a mixture of 3 parts by weight of n-butanol, 1 part by weight of ethanol and 1 part by weight of water. The increase of the Rf value of the spot of dye shows the completion of the conversion.

The organic dye containing the reactive group of the formula, $$-CH_2\underset{|}{N}COR^2SO^2CH_2CH_2OSO_3M$$
$$\phantom{-CH_2N}R^1$$

wherein $R^1$, $R^2$ and M are the same meanings as identified above, or the reactive group of the formula, $$-CH_2N-CO-R^2-SO_2-CH=CH_2$$
$$\phantom{-CH_2N}R^1$$

wherein $R^1$ and $R^2$ are the same meanings as identified above can be easily converted to the dye containing the reactive group of the formula, $$-CH_2\underset{|}{N}COR^2-SO_2-CH_2CH_2Z$$
$$\phantom{-CH_2N}R^1$$

wherein $R^1$, $R^2$ and Z have the same meanings as identified above by the treatment with primary, secondary or tertiary amine in an aqueous medium at a temperature of from 0° to 100° C. preferably from 40° to 80° C. As the primary, secondary and tertiary amines for example, alkylamines such as methylamine, ethylamine, butylamine, dimethylamine, diethylamine, diisopropylamine, trimethylamine, triethylamine and cyclohexylamine, cyclic amines such as pyridine, piperidine, morpholine, and hydrazines such as methylhydrazine and N,N-dimethylhydrazine are employed. The conversion occurs extremely easily, for example, the conversion can be conducted enough by adding the amine in an amount of 1 to 5 moles per mole of the dye into an aqueous solution of the dye and stirring at a temperature of from 40° to 80° C. for a short period of time. The completion of the conversion can be confirmed by the paper chromatography using, for example, as the developing agent a mixture of 3 parts by weight of n-butanol, 1 part by weight of ethanol and 1 part by weight of water. The disappearance of the unreacted material shows the completion of the conversion. And the organic dye containing the reactive group of the formula, $$-CH_2\underset{|}{N}COR^2SO_2CH_2CH_2OSO_3M$$
$$\phantom{-CH_2N}R^1$$

wherein $R^1$, $R^2$ and M are the same meanings as identified above, or the reactive group of the formula, $$-CH_2\underset{|}{N}-CO-R^2-SO_2-CH=CH_2$$
$$\phantom{-CH_2N}R^1$$

wherein $R^1$ and $R^2$ are the same meanings as identified above can be easily converted to the dye containing the reactive group of the formula, $$-CH_2\underset{|}{N}COR^2-SO_2-CH_2CH_2OSO_2M$$
$$\phantom{-CH_2N}R^1$$

wherein $R^1$, $R^2$ and M have the same meanings as identified above by treatment with thiosulfate salt in an aqueous solution at room temperature.

As the thiosulfate salt, sodium thiosulfate and potassium thiosulfate are employed.

The conversion is conducted, for example, as follows:
One to ten moles per mole of the dye of sodium thiosulfate is added to an aqueous solution of the dye, an alkali is added thereto to adjust the pH of the mixture at a value of from 8 to 12 and the mixture is stirred for a period of time of from several hours to scores of hours, while blowing carbon dioxide gas into the reaction mixture.

The progress of the reaction can be known by the paper-chromatography using, for example, as the developing agent a mixture of 3 parts by weight of n-butanol, 1 part by weight of ethanol and 1 part by weight of water. According to the paper-chromatographic analysis, the sulfatoethyl group is considered to be converted to the thiosulfatoethyl group through vinyl group.

The novel anthraquinone reactive dyes so produced may be represented conveniently by the following general formula $$Q-X-\underset{}{\underset{P}{\bigcirc}}(OH_2-\underset{|}{N}COR^2SO_2Y)_n$$
$$\phantom{Q-X-\bigcirc}R^1$$

wherein:

Q is residue of a dye of the anthraquinone series
$n$ is 1 to 2
ring P is further substituted by lower alkyl, lower alkoxy, phenoxy, tolyloxy, halogen or sulfonic acid
$R^1$ represents hydrogen or an alkyl radical having 1 to 2 carbons
$R^2$ represents a lower alkylene radical having 1 to 2 carbon atoms
X represents —NH— or —O—
Y represents a member selected from the group consisting of β-sulfatoethyl, vinyl, β-thiosulfatoethyl, and $$-CH_2CH_2Z$$

radicals wherein Z means $$-\underset{H}{N}\bigcirc,\ -\overset{+}{N}\bigcirc,\ -\underset{}{N}\bigcirc O,\ \pm\underset{|}{N}-N_2\ \text{or}\ -N\underset{R^4}{\overset{R^3}{\diagup}}$$
$$\phantom{xxxxxxxxxxxxxxxxxxxxxxxxxxx}CH_3$$
$$\phantom{xxxxxxxxxxxxxxxxxxxxxxxxxxxx}CH$$

wherein $R^3$ means hydrogen atom or an alkyl having 1 to 3 carbon atoms and $R^4$ means hydrogen atom, an alkyl having 1 to 3 carbon atoms or amino.

Alternatively, the anthraquinone reactive dyes of this invention may be represented thus:

Anthraquinone reactive dyes having the formula,

[structures of anthraquinone dyes with substituents D, O, A, B, C, NH shown]

wherein A means hydroxyl, amino, methylamino, cyclohexylamino, an alkylamino (the alkyl having 1 to 4 carbon atoms) or phenoxyanilimo; B means hydrogen atom, methyl, sulfonic acid group or an alkylphenoxy (the alkyl having 1 to 4 carbon atoms); C means an alkylanilino (the alkyl having 1 to 4 carbon atoms), an alkoxy-anilino (the alkoxy having 1 to 2 carbon atoms) or phenoxy-anilino; and D means hydrogen atom, hydroxyl or nitro, the Ds may be the same or different; the phenoxy and the anilino being substituted with 1 to 2 reactive groups having the formula,

wherein $R^1$ means hydrogen atom, an alkyl having 1 or 2 carbon atoms; $R^2$ means an alkylene having 1 or 2 carbon atoms; and Y means β-sulfatoethyl, vinyl, β-thiosulfatoethyl or —$CH_2CH_2Z$ wherein Z means

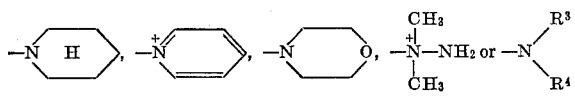

wherein $R^3$ means hydrogen atom or an alkyl having 1 to 3 carbon atoms, and $R^4$ means hydrogen atom, an alkyl having 1 to 3 carbon atoms or amino.

Using the thus-obtained organic dye which contains at least one of the reactive group of the present invention dyeing can be effected as described below with high fastnesses.

As the fiber materials which can be dyed with the reactive dyes of the present invention, nitrogen containing fibers and polyhydroxy fibers are given. As the nitrogen containing fibers, for example, wool, silk, polyamide and polyurethane fibers are given, and these fibers are dyed with the reactive dyes of the present invention, in general, in an acidic bath, or neutral bath, and if necessary in conjunction with alkaline treatment, thereby fixing the dye, with extreme fastnesses to light and especially to moisture.

As the polyhydroxy fibers, for example, cotton, linen, viscose and polyvinyl alcohol series fibers are given, and these fibers are dyed with the reactive dyes of the present invention in the presence of, for example, acid binding agent according to, for example, the cloth dyeing method or dyeing printing method, thereby fixing the dye, with extreme fastnesses to light and especially to moisture.

In the first place, the method for dyeing nitrogen containing fiber articles will be illustrated as follows:

The dyeing is conducted at a liquid ratio of from 1:20 to 1:100 at a temperature of from 50° to 100° C. preferably of from 90° to 100° C. for a period of time of from 1 to several hours using as an auxiliary agent, those materials usually employed for the dyeing of nitrogen containing fiber articles for the purpose of accelerating the absorption of dye, such as ammonium acetate, ammonium sulfate, sodium dihydrogen phosphate, sodium sulfate, acetic acid and formic acid.

Nonionic surface active agents such as polycondensation product of ethylene oxide with an amine, an alcohol or a phenol having substituted alkyl radical can be suitably added to the bath for the purpose of preventing spots dyeing, so-called skitteriness.

And, alkaline treatment can be conducted, if necessary, by adding on or before dyeing to the bath an alkaline material such as sodium bicarbonate, trisodium phosphate, urotropin and the like.

When such a present reactive dye as insoluble or difficultly soluble in water is employed, the nitrogen containing fibers can be dyed in a dispersed state of the dye. In such case dyeing is effected at a liquid ratio of from 1:20 to 1:100, at a temperature of from 50° to 100° C. preferably from 90° to 100° C. and employing auxiliary agent such as soap, anionic and nonionic surface active agents and the like.

In the next place, the dyeing method of polyhydroxy fiber with the present dyes according to the cloth dyeing method will be illustrated as follows:

Into an aqueous dipping solution containing a reactive dye of the present invention and a small amount of non-electrolytic substance such as urea, or inorganic salt, an article to be dyed is dipped at room temperature or at a slightly raised temperature and then the liquid is squeezed out so as to remain 0.4 to 1.5 part by weight of the solution of the dye per 1 part by weight of nontreated article to be dyed. In order to fix the dye to the article, for example, the thus dipped article is dried, treated with a chemical solution containing acid binding agent or acid binding agent producing material, and inorganic salt, squeezed, and then steamed or heat-treated for a short period of time. In another way the dye may be fixed to the article, by directly conducting steaming or heat-treatment, saving drying or acid binding agent treatment by adding acid binding agent or acid binding agent producing material into the dipping solution.

As the acid binding agents or acid binding agent producing materials, inorganic substances such as sodium hydroxide, sodium carbonate, sodium bicarbonate, trisodium phosphate are employed, and organic amines such as triethyl amine, urotropin may also be employed alone or together with the above mentioned inorganic substances.

In similar way as the above-described dyeing according to cloth dyeing method, the dyeing by printing method may also be conducted with the present reactive dyes. As the auxiliary agent to produce printing paste, paste materials such as urea, alkylcellulose and sodium alginate are employed. The auxiliary agent, the dye and the acid binding agent or the acid binding agent producing material are admixed to produce printing paste. The cloth is printed with this printing paste by using printing machine, dried and heat-treated. In the case of using a printing paste which does not contain acid binding agent or acid binding agent producing material, the printed article is subjected to alkaline treatment and then heat-treated.

The thus obtained dyed articles according to cloth dyeing or printing dyeing are preferably subjected with soaping treatment to remove the insufficiently fixed dye.

The soaping is effected by treating the dyed article with an aqueous solution of sodium bicarbonate, soap and nonioinc or anionic surface active agents, under heating, if necessary.

The present invention will be illustrated more concretely with reference to the following examples, which are given by way of illustration and not by way of limitation.

All parts and percents are by weight.

EXAMPLE 1

In 100 parts of 96% sulfuric acid 10 parts of sodium 1 - amino - 4 - (2',4',6'-trimethylanilino)anthraquinone-2-sulfonate is dissolved at a temperature of below 15° C. and 5.1 parts of β(β'-hydroxyethylsulfonyl)propionyl-N-methylolamide is slowly added thereto.

The reaction mixture is stirred for 10 hours at a temperature of 15° to 20° C. and then poured onto 500 parts of ice water. Seventy five parts of sodium chloride is added thereto, thereby to salt out the dye.

One-tenth part of a nonionic surface active agent of polyoxyethylene alkyl ether type is added thereto and the mixture is stirred for a while and allowed to stand for several hours.

The precipitated dye is separated easily by filtration, washed with 15% sodium chloride aqueous solution until the filtrate becomes neutral, and dried at a temperatture of below 80° C.

The thus obtained dye having the following formula:

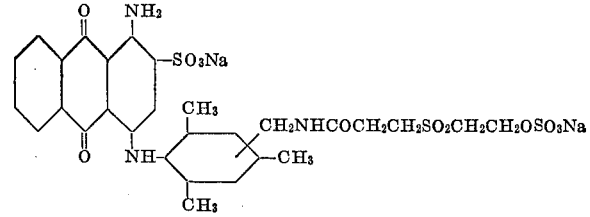

is employed for dyeing wool, nylon and cotton a reddish bluish shade with fastnesses.

EXAMPLE 2

In 100 parts of 96% sulfuric acid 10 parts of sodium 4 - (2',4',6' - trimethylanilino)-C-benzoyl-1,9-anthrapyridone-2-sulfonate is dissolved at a temperature of below 15° C. and 5.1 parts of β(β'-hydroxyethylsulfonyl)-propionyl-N-methyl-N-chloromethylamide is slowly added thereto. The reaction mixture is stirred for 10 hours at a temperature of 10° to 15° C. and then poured onto 500 parts of ice water dissolving 75 parts of sodium chloride. The precipitated dye is separated by filtration, washed with a 15% sodium chloride aqueous solution and dried. The thus obtained dye having the following formula:

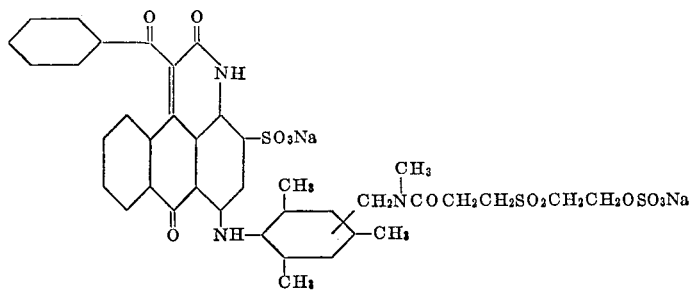

is employed for dyeing wool, nylon and cotton a bluish red shade with fastnesses.

EXAMPLE 3

In 100 parts of 96% sulfuric acid 10 parts of 1-cyclohexylamino-4-(2',4',6'-trimethylanilino)anthraquinone is dissolved at a temperature of below 15° C. and 5.5 parts of a 60% β-hydroxyethylsulfonylaceto-N-methylolamide aqueous solution is slowly added dropwise thereto. The reaction mixture is stirred for 10 hours at a temperature of 15° to 20° C. and then poured onto 500 parts of ice water. The precipitated product is separated by filtration, washed with water and dried. The thus obtained product is sulfonated with 6 times amount based on the theory of 5% oleum (a fuming sulfuric acid containing 5% $SO_3$) according to the conventional method, and salted out with sodium chloride.

The thus obtained dye having the following formula:

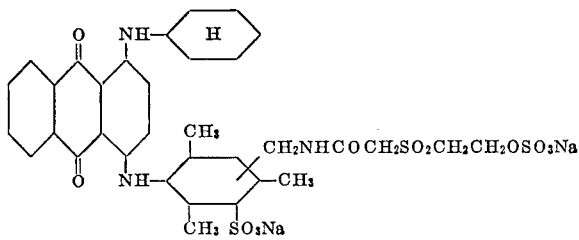

is employed for dyeing wool and cotton a blue shade with fastnesses.

EXAMPLE 4

In 100 parts of 93% sulfuric acid 10 parts of 1,4- bis [4' - (4''-methylphenoxy)anilino] anthraquinone is dissolved at a temperature of below 10° C. and 7.5 parts of a 60% β(β' - hydroxyethylsulfonyl)propionyl-N-methylolamide aqueous solution is slowly added dropwise thereto. The reaction mixture is stirred for 10 hours at a temperature of 10° to 15° C. and then cooled to a temperature of 0° to 5° C. Then 27% oleum (a fuming sulfuric acid containing 27% $SO_3$) is slowly added thereto until one drop of the reaction mixture is quite soluble in water.

Then the reaction mixture is slowly poured onto 700 parts of ice water dissolving 15% sodium chloride. The precipitated dye is separated by filtration, washed with 15% sodium chloride aqueous solution and dried. The thus obtained dye having the following formula:

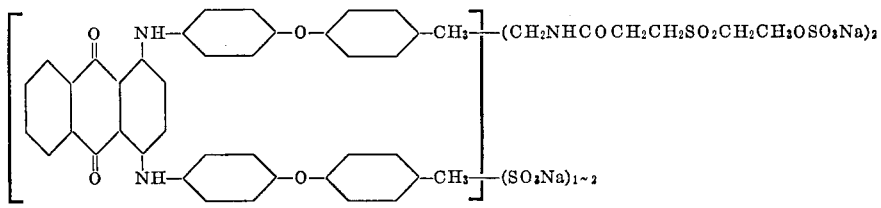

is employed for dyeing wool and cotton a bluish green shade with fastnesses.

EXAMPLE 5

In 100 parts of 90% sulfuric acid 10 parts of 1-amino-4-(4'-ethoxyanilino)anthraquinone-2-sulfonic acid is dissolved at a temperature of below 10° C. and 5.2 parts of β(β'-hydroxy-ethylsulfonyl)propionitrile and 3.7 parts of dichloromethyl ether are added thereto in the described order at a temperature of 0° to 5° C. The reaction mixture is subjected to reaction for 10 hours at a temperature of 10° to 15° C., and then poured onto 500 parts of ice water dissolving 10% potassium chloride. The precipitated dye is separated by filtration, washed with 10% potassium chloride aqueous solution and dried. The thus obtained dye having the following formula:

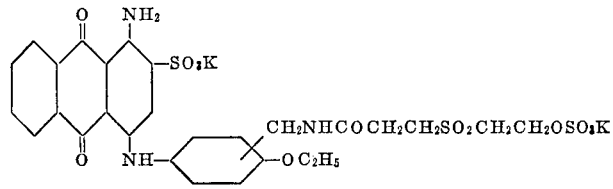

is employed for dyeing wool, nylon and cotton a greenish blue shade with fastnesses.

According to the method similar to that of Examples 1 to 5, further dyes are prepared which have the formulae shown in the following Table I and are employed for dyeing a textile material shades shown in the same table.

TABLE I

| Example No. | Formula | Shade |
|---|---|---|
| 6 | [anthraquinone structure with N-CH₃ imide, NH-linked trimethylcyclohexyl group bearing SO₃Na and CH₂NHCOCH₂CH₂SO₂CH₂CH₂OSO₃Na] | Red. |
| 7 | [anthraquinone with NH₂, OH, and O-linked methylcyclohexyl group bearing CH₂NHCOCH₂CH₂SO₂CH₂CH₂OSO₃Na] | Red. |
| 8 | [anthraquinone derivative with cyclohexyl-CO-CH=, NH, O-linked aryl-CH₃-CH₂N(CH₃)COCH₂CH₂SO₂CH₂CH₂OSO₃Na, and NH-trimethylphenyl-CH₃-SO₃Na] | Red. |
| 9 | [anthraquinone with NH₂ (imine), O-linked aryl-tert-C₄H₉-CH₂N(CH₃)COCH₂CH₂SO₂CH₂CH₂OSO₃Na, NH-dimethylphenyl-CH₃-SO₃Na] | Violet. |
| 10 | [anthraquinone with OH and NH-trimethylcyclohexyl bearing CH₂NHCOCH₂CH₂SO₂CH₂CH₂OSO₃Na] | Bluish violet. |
| 11 | [anthraquinone with NH₂ and NH-trimethylcyclohexyl bearing CH₂NHCOCH₂CH₂SO₂CH₂CH₂OSO₃Na] | Reddish blue. |
| 12 | [anthraquinone with NH₂, CH₃, and NH-trimethylcyclohexyl bearing CH₂NHCOCH₂CH₂SO₂CH₂CH₂OSO₃Na] | Do. |

TABLE I—Continued

| Example No. | Formula | Shade |
|---|---|---|
| 13 | [structure with anthraquinone, two NH-xylyl-nC₄H₉ groups, one with -(CH₂NHCOCH₂SO₂CH₂CH₂OSO₃Na)₂ and one with -(SO₃Na)₁₋₂, both aryl groups bearing Br and CH₃] | Do. |
| 14 | [1,4,5-trihydroxy-8-nitro anthraquinone with NH-trimethylphenyl group bearing CH₂NHCOCH₂CH₂SO₂CH₂CH₂OSO₃Na and SO₃Na] | Blue. |

EXAMPLE 15

In 100 parts of 96% sulfuric acid 10 parts of 1-(2', 5' - dichloro - 4' - sulfophenyl) - 4 - (2″,4″ - dimethylphenylazo)-3-methyl-5-pyrazolone is dissolved at a temperature of below 15° C. and 5.3 parts of β(β'-hydroxyethylsulfonyl)propionyl - N - methylolamide is slowly added thereto.

The reaction mixture is stirred for 10 hours at a temperature of 15° to 20° C. and then slowly poured onto 500 parts of ice water dissolving 75 parts of sodium chloride. The precipitated dye is separated by filtration, washed with 15% sodium chloride aqueous solution. The thus obtained dye having the formula:

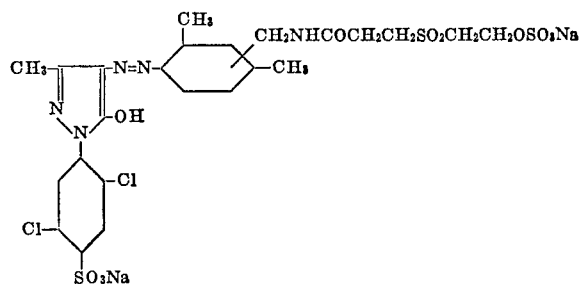

is employed for dyeing wool, nylon and cotton a yellow shade with fastnesses.

EXAMPLE 16

In 100 parts of 96% sulfuric acid 10 parts of sodium 7-amino-8-(2',4',6' - trimethylphenylazo) - 1 - naphthol-3-sulfonate is dissolved at a temperature of below 15° C. and 6.4 parts of β(β'-hydroxyethylsulfonyl)propionyl-N-methyl-N-chloromethyamide is slowly added thereto. The reaction mixture is stirred for 10 hours at a temperature of 15° to 20° C. and then poured onto 500 parts of ice water dissolving 50 parts of sodium cholride. The precipitated dye is separated by filtration, washed with 10% sodium chloride aqueous solution and dried.

The thus obtained dye having the following formula:

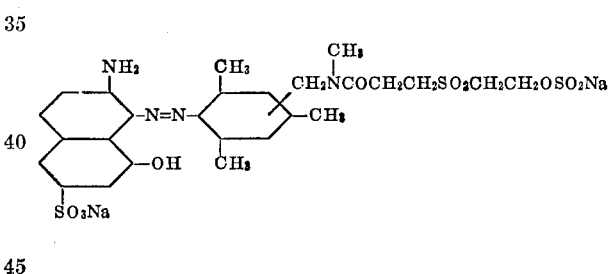

is employed for dyeing wool, nylon and cotton a red shade with fastnesses.

EXAMPLE 17

In 100 parts of 96% sulfuric acid 10 parts of 8-(2'-nitrophenylazo) - 7 - (2″,4″,6″ - trimethylanilino)-1-naphthol-3-sulfonic acid is dissolved at a temperature of below 15° C. and 7.5 parts of β(β'-hydroxyethylsulfonyl)-propionyl-N-methylolamide is slowly added thereto.

The reaction mixture is stirred for 5 hours at a temperature of 15° to 20° C. and then poured onto 500 parts of ice water dissolving 50 parts of sodium chloride. The precipitated dye is separated by filtration, washed with 10% sodium chloride aqueous solution and dried. The thus obtained dye having the following formua:

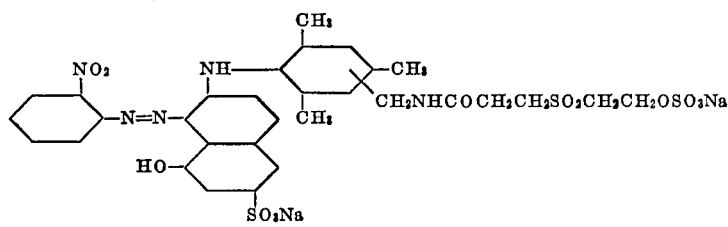

is employed for dyeing wools, nylon and cotton a dark violet shade with fastnesses.

EXAMPLE 18

In 100 parts of 96% sulfuric acid 10 parts of 1-(2',4' - dimethylphenyl) - 4 - (2" - chloro - 5" - sulfo-. The reaction mixture is stirred for 5 hours at a temperature of below 15° C. and 5.0 parts of β-hydroxy ethylsulfonylaceto - N - methylolamide is slowly added thereto. The reaction mixture is stirred for 10 hours at temperature of 15° to 20° C. and then poured onto 500 parts of ice water dissolving 50 parts of sodium chloride.

The precipitated dye is separated by filtration, washed with 10% sodium chloride aqueous solution.

2[5' - (2''',4''' - dimethylphenylamino) - 2' - sulfophenylazo]-1-naphthol-5-sulfonate is dissolved at a temperature of below 10° C. and 3.7 parts of β(β'-hydroxyethylsulfonyl)propionitrile and 2.6 parts of dichloromethyl ether are added thereto at a temperature of 0° thereto. The reaction mixture is stirred for 10 hours a temperature of 15° to 20° C. and the poured onto 500 parts of ice water dissolving 50 parts of potassium chloride.

The precipitated dye is separated by filtration, washed with 10% potassium chloride aqueous solution and dried. The thus obtained dye having the following formula:

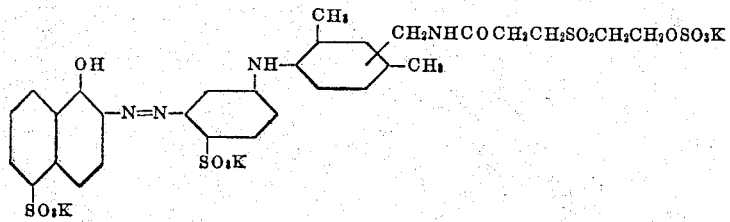

The thus obtained dye having the following formula:

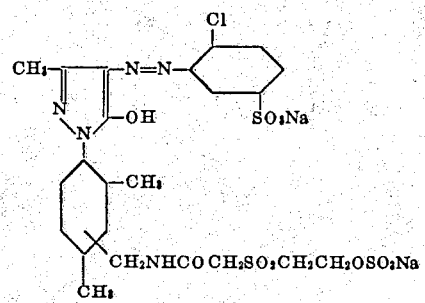

is employed for dyeing wools, nylon and cotton a yellow shade with fastnesses.

EXAMPLE 19

In 100 parts of 96% sulfuric arid 10 parts of sodium is employed for dyeing wool and nylon a reddish brown shade with fastnesses.

According to the method similar to that of Examples 15 to 19, further dyes are prepared which have the formulae shown in the Table II and are employed for dyeing a textile material shades shown in the same table.

TABLE II

| Example No. | Formula | Shade |
|---|---|---|
| 20 | [structure with CH₃, N=N, OH, SO₃Na, Cl, O, CH₃]—CH₂NHCOCH₂CH₂SO₂CH₂CH₂OSO₃Na | Yellow. |
| 21 | [structure with CH₃, N=N, NO₂, HO, SO₃Na, OH, CH₃, CH₂NHCOCH₂SO₂CH₂CH₂OSO₃Na, CH₃] | Reddish yellow. |
| 22 | [structure with OH, N=N, CH₃, CH₂NCOCH₂CH₂SO₂CH₂CH₂OSO₃Na, CH₃, SO₃Na] | Orange. |

TABLE II—Continued

| Example No. | Formula | Shade |
|---|---|---|
| 23 | (naphthalene with NHCOCH₃, HO, SO₃Na)—N=N—(benzene with CH₃, CH₃, CH₂NHCOCH₂CH₂SO₂CH₂CH₂OSO₃Na) | Do. |
| 24 | (naphthalene with OH, SO₃K, SO₃K)—N=N—(benzene with CH₃, CH₃, CH₂N(C₂H₅)COCH₂SO₂CH₂CH₂OSO₃K) | Yellowish red. |
| 25 | (naphthalene with OH, SO₃Na)—N=N—(benzene with NHCOCH₃, SO₂N(C₂H₅)(benzene with CH₃, CH₃, CH₂NHCOCH₂CH₂SO₂CH₂CH₂OSO₃Na)) | Red. |
| 26 | (naphthalene with NHCOCH₃, OH, SO₃Na)—N=N—(benzene with CH₃, CH₃, CH₂NHCOCH₂SO₂CH₂CH₂OSO₃Na) | Yellowish red. |
| 27 | [(naphthalene with NH₂, OH, SO₃Na)—N=N—(benzene)—O—(benzene-CH₃)]—CH₂NHCOCH₂CH₂SO₂CH₂CH₂OSO₃Na | Red. |
| 28 | (naphthalene with NH₂, OH, SO₃Na)—N=N—(benzene with OCH₃, CH₃, CH₂NHCOCH₂CH₂SO₂CH₂CH₂OSO₃Na) | Bluish red. |
| 29 | [(naphthalene with CH₃CONH, OH, SO₃Na, SO₃Na)—N=N—(benzene)—O—(benzene-CH₃)]—CH₂NHCOCH₂CH₂SO₂CH₂CH₂OSO₃Na | Red. |
| 30 | [(benzene with SO₃Na)—N=N—(naphthalene with OH, NH(benzene with CH₃, CH₃), SO₃Na)]—CH₂NHCOCH₂CH₂SO₂CH₂CH₂OSO₃Na | Violet. |
| 31 | [(CH₃-benzene)—CONH—(naphthalene with OH, NaO₃S, SO₃Na)—N=N—(benzene with CH₃, CH₃, CH₂)]—CH₂NHCOCH₂CH₂SO₂CH₂CH₂OSO₃Na | Bluish red. |
| 32 | (naphthalene with OH, OH, KO₃S, SO₃K)—N=N—(benzene with CH₃, CH₃, CH₂NHCOCH₂SO₂CH₂CH₂OSO₃Na) | Do. |

TABLE II—Continued

| Example No. | Formula | Shade |
|---|---|---|
| 33 | | Bluish violet. |
| 34 | | Black. |
| 35 | | Brown. |
| 36 | | Do. |
| 37 | | Black. |

EXAMPLE 38

In 50 parts of 90% sulfuric acid 10 parts of 7-(2',4',6'-trimethylanilino)-1-naphthol-3-sulfonic acid is dissolved at a temperature of 0° C. and 11 parts of β(β'-hydroxyethylsulfonyl)-propionyl - N - methylolamide is slowly added thereto. The reaction mixture is stirred for 3 hours at a temperature of 5° to 10° C. and then poured onto 300 parts of ice water.

Fifty parts of sodium chloride is added thereto, thereby to salt out the dye, which is separated by filtration and washed with 15% sodium chloride aqueous solution.

(CuPc means copper phthalocyanine)

The thus obtained precipitate is dissolved in water and coupled with a diazotizsed 2-nitroaniline in an acidic medium according to the conventional method, thereby the same dye as obtained in Example 17 is obtained.

EXAMPLE 39

Five point eight parts of copper phthalocyanine is chlorosulfonated by the conventional method to obtain a tetrasulfonylchloride, which is subjected to condensate with 4.1 parts of 2,4,6-trimethylaniline. Ten parts of the thus obtained product is dissolved in 100 parts of 96% sulfuric acid at a temperature of below 5° C. and 6.4 parts of β(β' - hydroxyethylsulfonyl)propionyl-N-methylolamide is slowly added thereto.

The reaction mixture is stirred for 10 hours at a temperature of 5° to 10° C. and then poured onto 500 parts of ice water dissolving 25 parts of sodium chloride.

The precipitated dye is separated by filtration, washed with 5% sodium chloride aqueous solution and dried.

The thus obtained dye having, as a principal constituent, the following estimated formula,

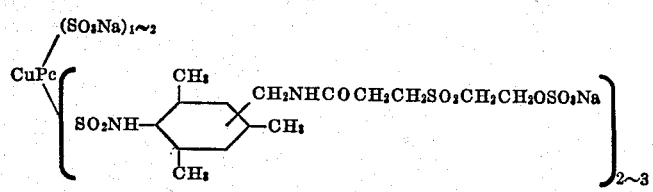

is employed for dyeing wool and cotton a greenish blue shade with fastnesses.

EXAMPLE 40

In 100 parts of 96% sulfuric acid 10 parts of sodium 4 - amino-N-(2',4'-dimethylphenyl) naphthalimide-3-sulfonate is dissolved at a temperature of below 10° C. and 5.8 parts of β(β' - hydroxyethylsulfonyl)propionyl-N-methylolamide is slowly added thereto.

The reaction mixture is stirred for 10 hours at a temperature of 10° to 15° C. and then poured onto 500 parts of ice water dissolving 75 parts of sodium chloride.

The precipitated dye is separated by filtration, washed with 15% sodium chloride aqueous solution and dried.

The thus obtained dye having the following formula:

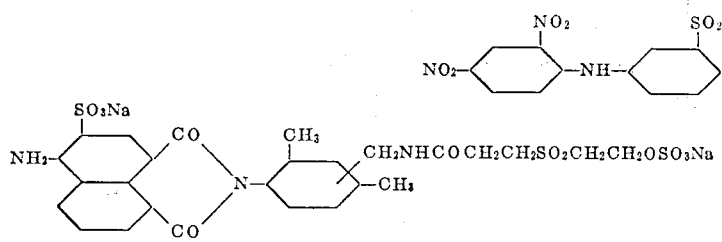

is employed for dyeing wool, nylon and cotton a brilliant greenish yellow with fastnesses, especially to washing.

EXAMPLE 41

In 100 parts of 90% sulfuric acid 10 parts of 4-(2″,4″-dimethylphenylamino)-2′,4′-dinitro - 1,1′ - diphenylamine-3-sulfonic acid is dissolved at a temperature of below 10° C. and 4.7 parts of β-hydroxyethylsulfonyl-aceto-N-methylolamide is slowly added thereto.

The reaction mixture is stirred for 10 hours at a temperature of 10° to 15° C. and then poured onto 500 parts of ice water dissolving 50 parts of sodium chloride. The precipitated dye is separated by filtration, washed with 10% sodium chloride aqueous solution and dried. The thus obtained dye having the following formula:

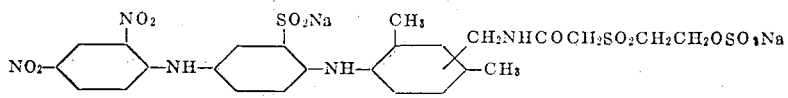

is employed for dyeing wool and cotton a yellow shade with fastnesses.

According to the method similar to that of Examples 39, 40 and 41, further dyes are prepared which have the formulae shown in the following Table III and are employed for dyeing a textile material shades shown in the same table.

TABLE III

| Example No. | Formula | Shade |
|---|---|---|
| 42 | CoPc(SO₃H)₁₋₃(SO₂NH—⟨⟩(CH₃)(CH₃)—CH₂NHCOCH₂SO₂CH₂CH₂OSO₃Na)₁₋₃ | Greenish blue. |
| 43 | [CuPc—O—⟨⟩(SO₃Na)(CH₃)—CH₂NCOCH₂CH₂SO₂CH₂CH₂OSO₃Na / CH₃]₂ | Green. |
| 44 | [anthraquinone-NO₂,NO₂ derivative]—SO₂NH—⟨⟩(CH₃)(SO₃Na)(CH₃)—CH₂NHCOCH₂SO₂CH₂CH₂OSO₃Na)₂ | Gray. |
| 45 | [CH₃—⟨⟩(CH₃)—NH—⟨⟩(SO₃Na)(Cl)=N—O—⟨⟩—O—N=(Cl)—NH—⟨⟩(CH₃)—CH₃—SCO₃Na]—(CH₂NHCOCH₂SO₂CH₂CH₂OSO₃Na)₂ | Greenish blue. |
| 46 | [H₅C₂NH—⟨⟩(SO₃Na)(CH₃)—N=⟨phenazine with CH₃-⟨⟩-CH₃⟩=N(C₂H₅)₂]—CH₂NHCOCH₂CH₂SO₂CH₂CH₂OSO₃Na | Blue. |

TABLE III—Continued

| Example No. | Formula | Shade |
|---|---|---|
| 47 | 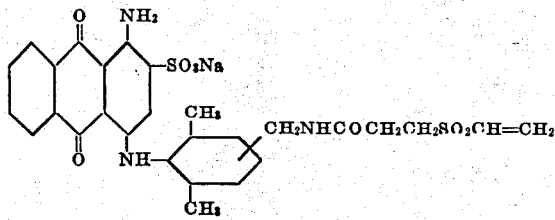 | Grey. |

EXAMPLE 48

The wet cake of the dye obtained in Example 1 is dissolved in 400 parts of water while stirring. The pH is adjusted to 8.0 to 9.0 by adding 10% sodium carbonate aqueous solution.

The solution is stirred for 1 hour and then 60 parts of sodium chloride is added thereto to salt out the dye, which is separated by filtration, washed with 15% sodium chloride aqueous solution and dried. The thus obtained dye having the following formula:

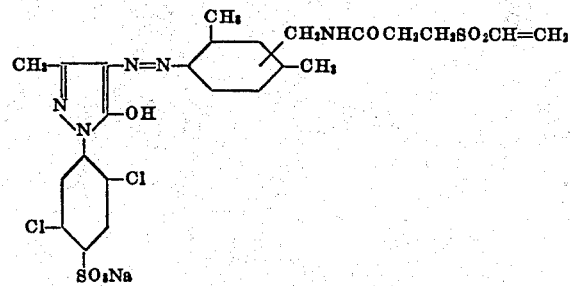

is employed for dyeing wool, nylon and cotton a reddish blue shade with fastnesses.

EXAMPLE 49

The wet cake of the dye obtained in Example 15 is suspended in 400 parts of 15% sodium chloride aqueous solution while stirring. The pH is adjusted to 8.0 to 9.0 by adding 10% sodium hydroxide aqueous solution. After stirring for 1 hour, the precipitated dye is separated by filtration, washed with 15% sodium chloride aqueous solution and dried. The thus obtained dye having the following formula:

is employed for dyeing wool, nylon and cotton a yellow shade with fastnesses.

EXAMPLE 50

In 100 parts of 96% sulfuric acid, 10 parts of 3-amino-2′,4′-dimethyl-1,1′-diphenyamine-4-sulfonic acid is dissolved at a temperature of below 10° C. and 10 parts of β(β′-hydroxyethylsulfonyl)propionyl - N - chloromethylamide is slowly added thereto. The reaction mixture is stirred for 20 hours at a temperature of 10° to 15° C. and then poured onto 500 parts of ice water dissolving 75 parts of potassium chloride. The precipitate is separated by filtration and washed with 15% potassium chloride. The product is dissolved in water, diazotized and coupled with 1-naphthol-5-sulfonic acid under the alkaline condition according to the conventional method and then salted out by potassium chloride. The thus obtained dye having the formula:

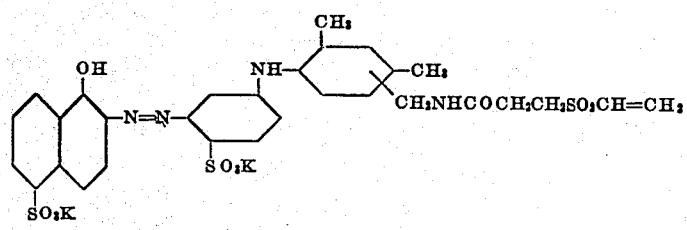

is employed for dyeing wool and cotton a reddish brown shade with fastnesses.

EXAMPLE 51

In 100 parts of 96% sulfuric acid 10 parts of 3-amino-2′,4′-dimethyl-1,1′-diphenylamine-4-sulfonic acid is dissolved at a temperature below 10° C. and 10 parts of β(β′-hydroxyethylsulfonyl)propionyl - N - chloromethylamide is slowly added thereto. The reaction mixture is stirred for 20 hours at a temperature of 10° to 15° C. and then poured onto 500 parts of ice water dissolving 75 parts of potassium chloride. The precipitated product is separated by filtration and washed with 15% potassium chloride aqueous solution.

The thus obtained product is dissolved in 300 parts of water and the wet cake of copper phthalocyanine tetrasulfonylchloride, which is obtained by chlorosulfonating 5.0 parts of copper phthalocyanine by the conventional method, is added thereto. After adjusting the pH of the liquid to 9 to 10 by adding 10% sodium carbonate aqueous solution, the reaction mixture is stirred for 3 hours at a temperture of 40° to 50° C. and then 45 parts of sodium chloride is added thereto to salt out the dye, which is separated by filtration, washed with 15% sodium chloride aqueous solution and dried.

The thus obtained dye having, as a principal constituent, the following estimated formula:

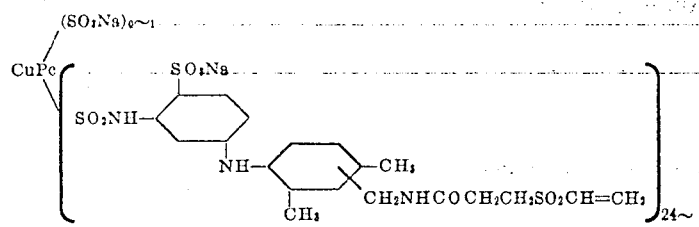

is employed for dyeing wool and cotton a greenish blue shade with fastnesses.

According to the method similar to that of Examples 48 to 51, further dyes are prepared, which have the formulae shown in the following Table IV and are employed for dyeing a textile material shades shown in the same table.

TABLE IV

| Example No. | Formula | Shade |
|---|---|---|
| 52 | (anthraquinone structure with -SO₃Na, NH-cyclohexyl-CH₃ groups, CH₂NCOCH₂CH₂SO₂CH=CH₂) | Bluish red. |
| 53 | (anthraquinone with NH₂, O-phenyl-tC₄H₉, CH₃, CH₂NCOCH₂SO₂CH=CH₂, SO₃Na) | Violet. |
| 54 | (anthraquinone with NH₂, NH-cyclohexyl with CH₂NHCOCH₂CH₂SO₂CH=CH₂, CH₃) | Reddish blue. |
| 55 | (anthraquinone with NH₂, SO₃Na, NH-phenyl-OC₂H₅, CH₂NCOCH₂CH₂SO₂CH=CH₂, C₂H₅) | Greenish blue. |

TABLE IV—Continued

| Example No. | Formula | Shade |
|---|---|---|
| 56 | Cromium complex dye of [structure with pyrazolone, $CH_3$, $N=N$, $NO_2$, $HO$, $SO_3Na$, $CH_3$, $CH_2NHCOCH_2CH_2SO_2CH=CH_2$] | Orange. |
| 57 | [naphthalene with $NHCOCH_3$, $HO$, $SO_3Na$, $-N=N-$, $CH_3$, $CH_3$, $CH_2NHCOCH_2CH_2SO_2CH=CH_2$] | Do. |
| 58 | [naphthalene with $NH_2$, $OH$, $SO_3Na$, $-N=N-$, $OCH_3$, $CH_3$, $CH_2NHCOCH_2CH_2SO_2CH=CH_2$] | Red. |
| 59 | $[CH_3-\bigcirc-CONH$ ... $OH$ ... $-N=N-$ ... $CH_3$, $CH_3$, $-SO_3K$, $SO_3K$, $CH_3$, $CH_3NCOCH_2CH_2SO_2CH=CH_2]$ | Red. |
| 60 | $O_2N-\bigcirc-N=N-$[naphthalene $NH_2$, $OH$, $SO_3Na$, $SO_3Na$]$-N=N-$[benzene $CH_3$, $CH_3$, $CH_2NHCOCH_2SO_2CH=CH_2$] | Black. |
| 61 | $CuPc\begin{pmatrix}(SO_3Na)_{1\sim 2}\\ (SO_2NH-\bigcirc \begin{smallmatrix}CH_3\\ CH_3\end{smallmatrix} CH_2NHCOCH_2SO_2CH=CH_2)_{1\sim 3}\end{pmatrix}$ | Greenish blue. |

EXAMPLE 62

The wet cake of the dye obtained in Example 1 is dissolved in 400 parts of water while being stirred and 10.6 parts of 30% diethylamine aqueous solution is added thereto. After raising temperature to 40° to 50° C., the reaction mixture is stirred for 3 hours at that level.

Sixty parts of sodium chloride is added thereto to salt out the dye which is separated by filtration, washed with 15% sodium chloride and dried.

The thus obtained dye having the following formula:

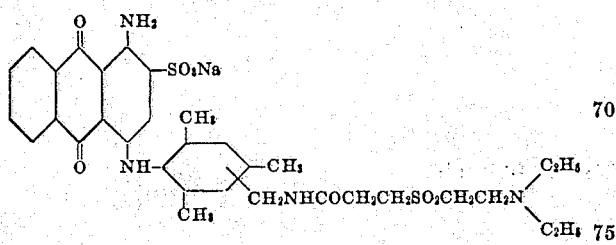

is employed for dyeing wool, nylon and cotton a reddish blue shade with fastnesses.

EXAMPLE 63

The wet cake of the dye obtained in Example 49 is dissolved in 400 parts of water while stirring and 5.0 parts of piperizine is added thereto. After raising temperature to 60° to 80° C., the reaction mixture is stirred for 3 hours at that level.

Sixty parts of sodium chloride is added thereto to salt out the dye, which is separated by filtration, washed with 15% sodium chloride aqueous solution, and dried.

The thus obtained dye having the following formula:

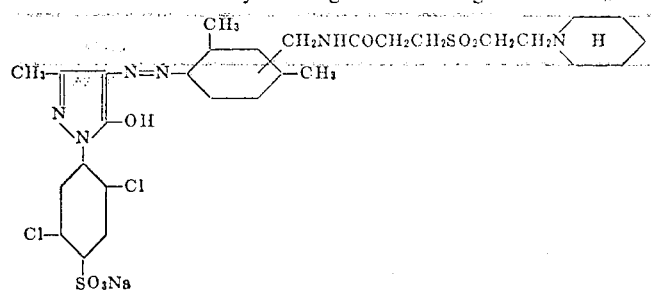

is employed for dyeing wool, nylon and cotton a yellow shade with fastnesses.

According to the method similar to that of Examples 62 and 63, further dyes are prepared, which have the formulae shown in the following Table V and are employed for dyeing a textile material shades shown in the same table.

TABLE V

| Example No. | Formula | Shade |
|---|---|---|
| 64 | | Yellowish red. |
| 65 | | Reddish blue. |
| 66 | | Greenish blue. |
| 67 | | Yellow. |
| 68 | | Brown. |
| 69 | | Red. |

TABLE V—Continued

| Example No. | Formula | Shade |
|---|---|---|
| 70 | (structure) | Black. |
| 71 | (structure) | Yellow. |

EXAMPLE 72

The wet cake of the dye obtained in Example 1 is dissolved in 400 parts of water.

Ten percent sodium hydroxide aqueous solution is added thereto until the pH of the solution becomes 12 and then 7 parts of sodium thiosulfate pentahydrate ($Na_2S_2O_3 \cdot 5H_2O_7$) is added thereto.

During the reaction mixture is stirred for 10 hours at a temperature of 20° to 30° C., carbon dioxide is blown thereinto.

After the reaction is accomplished 80 parts of sodium chloride is added thereto and 0.1 part of a nonionic surface agent of polyoxyethylene alkyl ether type is added thereto.

The reaction mixture is stirred for a while and then allowed to stand for several hours. The precipitated dye is easily separated by filtration, washed with 15% sodium chloride aqueous solution and dried.

The thus obtained dye having the following formula:

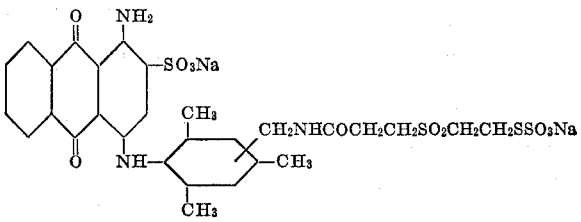

is employed for dyeing wool, nylon and cotton a reddish blue shade with fastnesses.

EXAMPLE 73

The wet cake of the dye obtained in Example 57 is dissolved in 400 parts of water and 6 parts of potassium thiosulfate is added thereto. During the reaction mixture is stirred for 10 hours at a temperature of 20° to 30° C., carbon dioxide is blown thereinto.

After the reaction is accomplished, 80 parts of sodium chloride is added thereto to salt out the dye, which is separated by filtration, washed with 15% sodium chloride aqueous solution and dried.

The thus obtained dye having the following formula:

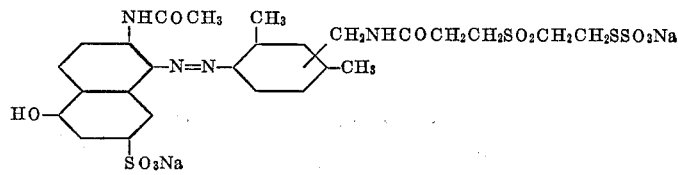

is employed for dyeing wool, nylon and cotton an orange shade with fastnesses.

According to the method similar to that of Examples 72 and 73, further dyes are prepared, which have the formulae shown in the following Table VI and are employed for dyeing a textile material shades shown in the same table.

TABLE VI

| Example No. | Formula | Shade |
|---|---|---|
| 74 | (anthraquinone with NH₂, O-phenyl-CH₃, CH₂NHCOCH₂SO₂CH₂CH₂SSO₃Na, OH) | Red. |
| 75 | [phenyl-CO-C(=)-CO-NH- anthraquinone-O-phenyl-CH₃-CH₂N(CH₃)COCH₂CH₂SO₂CH₂CH₂SSO₃Na; NH-xylyl(CH₃)₂-SO₃Na] | Red. |
| 76 | [anthraquinone-NH₂, O-phenyl-C₄H₉-CH₂NHCOCH₂CH₂SO₂CH₂CH₂SSO₃Na; NH-xylyl(CH₃)₂-SO₃Na] | Violet. |
| 77 | anthraquinone with NH₂, SO₃Na, NH-phenyl(CH₃)₂-CH₂NHCOCH₂CH₂SO₂CH₂CH₂SSO₃Na | Blue. |
| 78 | (pyrazolone: CH₃, N=N-phenyl(CH₃)₃-CH₂N(CH₃)COCH₂CH₂SO₂CH₂CH₂SSO₃Na; OH; N-dichlorophenyl-SO₃Na) | Yellow. |
| 79 | (naphthalene: NHCOCH₃, N=N-phenyl(CH₃)₂-CH₂N(C₂H₅)COCH₂CH₂SO₂CH₂CH₂SSO₃Na; HO; SO₃Na) | Brown. |
| 80 | [CH₃-phenyl-CONH-naphthol(KO₃S, SO₃K)-N=N-phenyl(CH₃)₂-CH₂NHCOCH₂SO₂CH₂CH₂SSO₃K] | Red. |
| 81 | CuPc[(SO₃H)₁₋₂ ; (SO₂NH-phenyl(CH₃)₂-CH₂NHCOCH₂CH₂SO₂CH₂CH₂SSO₃Na)₂₋₃] | Greenish blue. |
| 82 | O₂N-phenyl(NO₂)-NH-phenyl(SO₃Na)-NH-phenyl(CH₃)₂-CH₂NHCOCH₂CH₂SO₂CH₂CH₂SSO₃Na | Yellow. |

EXAMPLE 83

Two-tenths part of the dye obtained in Example 1 is dissolved in 200 parts of water and 0.1 part of acetic acid is added thereto.

Ten parts of wool is dipped in the thus prepared dyeing bath and heated up to 95° C.

After 10 minutes, 0.1 part of formic acid is added to the dyeing bath.

The temperature is kept at that level for additional 50 minutes, thereby to finish the dyeing. Finally the wool is rinsed in cold water and dried. The reddish blue wool is obtained having an excellent fastness to washing.

EXAMPLE 84

Two-tenths part of the dye obtained in Example 15 is dissolved in 200 parts of water and 0.1 part of acetic acid is added thereto. Ten parts of nylon (a polyamide) fiber is dipped in the thus prepared dyeing bath and heated up to 95° C. After 10 minutes 0.1 part of formic acid is added to the bath.

The temperature is kept at that level for additional 50 minutes, thereby to finish the dyeing. Finally the nylon fiber is rinsed in cold water and dried. The yellow nylon fiber is obtained having an excellent fastness to washing.

EXAMPLE 85

Two-tenth part of the dye obtained in Example 16 is dissolved in 200 parts of water and is treated with 0.1 part of trisodium phosphate at room temperature.

A half part of acetic acid and 1.0 part of sodium sulfate are added thereto and 10 parts of wool is dipped into the thus prepared bath, and heated up to 95° C.

After 10 minutes, 0.2 part of formic acid is added to the bath. The temperature is kept at that level for additional 50 minutes, thereby to finish the dyeing. Finally the wool is rinsed in cold water and dried. The red wool is obtained having an excellent fastness to washing.

EXAMPLE 86

Two-tenth part of the dye obtained in Example 61 is dissolved in 200 parts of water, and 0.2 part of acetic acid and 0.2 part of a nitrogen containing nonionic surface acitve agent, that is a polycondensation product of an alkylamine with ethylene oxide, are added thereto. Ten parts of wool is immersed in the thus prepared dyeing bath and heated to 95° C. After 10 minutes, 0.1 part of formic acid is added to the bath.

The temperature is kept at that level for additional 50 minutes, thereby to finish the dyeing. Finally the wool is rinsed in cold water and dried. The greenish blue wool is obtained having an excellent fastness to washing.

EXAMPLE 87

Two-tenth part of the dye obtained in Example 54 and 0.2 part of soap is added to 300 parts of water to prepare the dispersion. Ten parts of a polyamide fiber is dipped in the thus preared dyeing bath, and the dyeing is conducted for 1 hour at 95° C. The polyamide fiber is rinsed in cold water and dried. The reddish blue polyamide fiber is obtained having an excellent fastness to washing.

EXAMPLE 88

According to the procedure similar to that of Example 83, the dye obtained in Example 71 dyes wool a brilliant greenish yellow shade with an excellent fastness to washing.

EXAMPLE 89

According to the procedure similar to that of Example 83, the dye obtained in Example 72 dyes wool a reddish blue shade with an excellent fastness to washing.

EXAMPLE 90

Two parts of the dye obtained in Example 5 and 8 parts of urea are dissolved in 40 parts of boiling water and the thus obtained solution is added to 40 parts of a 5% sodium alginate aqueous solution while being stirred. After cooling, 10 parts of a 20% sodium carbonate aqueous solution is added thereto. The resulting printing paste of the dye is printed on cotton cloth with a printing machine and the cloth is dried, and steamed for 5 minutes. After rinsing in water, the printed cloth is boiled for 10 minutes in a 0.2% sodium carbonate aqueous solution and a 0.5% aqueous solution of sulfuric ester of an alkylalcohol, rinsed in water and dried. The greenish blue cotton cloth having good fastnesses is obtained.

EXAMPLE 91

One part of the dye obtained in Example 29 is dissolved in a mixture of 50 parts of water and 5 parts of urea.

Cotton fabric is impregnated with the thus prepared solution at room temperature and the excess liquor is squeezed off until the weight of the fabric shows an increase of 60 to 70%. The impregnated fabric is died and immersed in a chemical solution containing per litre 10 parts of sodium hydroxide and 300 parts of sodium chloride, squeezed to a weight increase of 100%, steamed for 5 minutes, rinsed in water, boiled for 10 minutes in a 0.2% sodium carbonate aqueous solution and a 0.5% aqueous solution of sulfuric ester of an alkylalcohol, rinsed in water and dried.

The thus obtained bluish red fabric has excellent fastnesses.

EXAMPLE 92

One part of the dye obtained in Example 39 is dissolved in a mixture of 50 parts of water, 5 parts of urea and 1 part of sodium carbonate.

Cotton fabric is impregnated with the thus prepared solution at room temperature and excess liquor is squeezed off until the weight of the fabric shows an increase of 60%.

The impregnated fabric is dried, subject to the heat-treatment for 3 minutes at a temperature of 130° to 150° C., rinsed in water, boiled for 10 minutes in a 0.2% sodium carbonate aqueous solution and a 0.5% aqueous solution of sulfuric ester of an alkylalcohol, rinsed in water and dried.

The thus obtained greenish blue fabric has excellent fastnesses.

EXAMPLE 93

According to the procedure similar to that of Example 90, the dye obtained in Example 59 dyes cotton fabric a red shade with fastnesses.

EXAMPLE 94

According to the procedure to that of Example 91, the dye obtained in Example 80 dyes cotton fabric a red shade with fastenesses.

EXAMPLE 95

Thirty parts of $\beta(\beta'$-hydroxyethylmercapto)propionitrile is added dropwise with 48.7 parts of 32% hydrogen peroxide aqueous solution at a temperature below 40° C. over a period of about 30 minutes under cooling. The reaction mixture is nearly neutralized with an addition of several drops of 20% sodium hydroxide aqueous solution, slowly heated over a period of 1 hour, and boiled at 102° C. under reflux until hydrogen peroxide completely disappears in the potassium iodide starch paper test.

A trace of remaining hydrogen peroxide is completely removed by the addition of a small amount of sodium bisulfite. The mixture is neutralized with an addition of several drops of 20% sodium hydroxide aqueous solution and concentrated in vacuo at a temperature of below 35° C. to remove water, thereby 38 parts of a brownish sirup is obtained.

The brown sirup is added with 5.0 parts of 20% sodium hydroxide aqueous solution and then added slowly dropwise with 71.5 parts of 12.0% hydrogen peroxide aqueous solution at a temperature below 30° C. After about 4 hours, hydrogen peroxide is completely removed, the reaction mixture is neutralized with about 1 cc. of concentrated hydrochloric acid, and concentrated in vacuo at a temperature below 35° C. to remove water.

The precipitated white needles are collected by filtration and the crystals are completely separated from the filtrate to yield 25.0 parts of β(β'-hydroxyethylsulfonyl)-propionamide, M.P. 132° C.

*Analysis.*—Calculated as $C_5H_{11}NO_4S$ (percent): C, 33.1; H, 6.1; N, 7.7; S, 17.7; O, 35.3. Found (percent): C, 32.9; H, 6.3; N, 7.4; S, 17.7; O, 36.0.

The white crystals of β(β'-hydroxyethylsulfonyl)-propionamide are added with twice amount of its weight of water and 11.2 parts of 37% Farmalin, and the pH is adjusted to 7 to 11 by several drops of 20% sodium hydroxide aqueous solution, and then the mixture is kept at a temperature of 30° to 35° C. for 2 hours. The reaction mixture is concentrated in vacuo at a temperature below 35° C. to remove water, thereby 30 parts of β(β'-hydroxyethylsulfonyl)propionyl-N-methylolamide is obtained as a colorless sirup, which is dried completely over a long period of time, thereby to yield extremely hygroscopic white crystals.

What we claim is:
1. Anthraquinone reactive dye having the formula,

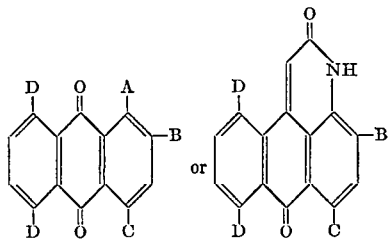

wherein A means hydroxyl, amino, cyclohexylamino, alkylamino (the alkyl having 1 to 4 carbon atoms) or phenoxyanilino; B means hydrogen atom, methyl, sulfonic acid group or an alkylphenoxy (the alkyl having 1 to 4 carbon atoms); C means an alkylanilino (the alkyl having 1 to 4 carbon atoms), an alkoxyanilino (the alkoxy having 1 or 2 carbon atoms) or phenoxyanilino; and D means hydrogen atom, hydroxyl or nitro, the D's may be the same or different; the phenoxy and the anilino being substituted with 1 or 2 reactive groups having the formula,

wherein $R^1$ means hydrogen atom, and alkyl having 1 or $R^3$ means an alkylene having 1 or 2 carbon atoms; 2 carbon atoms; and Y means β-sulfatoethyl, vinyl, β-thiosulfatoethyl or —$CH_2CH_2Z$ wherein Z means

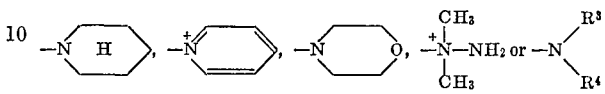

wherein $R^3$ means hydrogen atom or an alkyl having 1 to 3 carbon atoms, and $R^4$ means hydrogen atom, an alkyl having 1 to 3 carbon atoms or amino.

References Cited
UNITED STATES PATENTS

| | | | |
|---|---|---|---|
| 2,670,265 | 2/1954 | Heyna et al. | 260—158 XR |
| 2,799,673 | 7/1957 | Bolliger | 260—163 |
| 3,169,124 | 2/1965 | Ischer et al. | 260—163 |
| 3,206,483 | 9/1965 | Guenthard et al. | 260—377 |
| 3,419,541 | 12/1968 | Kuhne et al. | 260—162 |
| 3,426,008 | 2/1969 | Meininger et al. | 260—162 XR |
| 2,303,191 | 11/1942 | Baldwin et al. | 260—56 XR |
| 2,763,692 | 9/1956 | Gregory | 260—607 XR |
| 2,793,234 | 5/1957 | Metivier | 260—607 |
| 2,802,035 | 8/1957 | Fincke | 260—607 |
| 2,936,323 | 5/1960 | Eden | 260—561 XR |
| 3,247,184 | 4/1966 | Blass et al. | 260—162 |
| 3,301,884 | 1/1967 | Meininger et al. | 260—453 |
| 3,354,182 | 11/1967 | Kuhne et al. | 260—152 XR |

OTHER REFERENCES

Pomerantz et al., J. Am. Chem. Soc., vol. 61, pp. 3386 to 3388 (1939).

Migrdichian, "The Chemistry of Organic Cyanogen Compounds," pp. 46 and 47 (1947).

FLOYD D. HIGEL, Primary Examiner

U.S. Cl. X. R.

8—4, 34, 39, 41, 50; 117—138.8; 260—37, 156, 163, 185, 199, 246, 247.1, 272, 281, 314.5, 372, 377, 453, 456, 465.6, 561